(12) United States Patent
Vanraaphorst et al.

(10) Patent No.: US 12,214,827 B2
(45) Date of Patent: Feb. 4, 2025

(54) EXPOSED STRUCTURAL CORNER REINFORCEMENT

(71) Applicant: Zephyros, Inc., Romeo, MI (US)

(72) Inventors: Max Vanraaphorst, Romeo, MI (US); Jeffery T. Shantz, Romeo, MI (US); Garrett Taylor, Romeo, MI (US)

(73) Assignee: ZEPHYROS, INC., Romeo, MI (US)

( * ) Notice: Subject to any disclaimer, the term of this patent is extended or adjusted under 35 U.S.C. 154(b) by 134 days.

(21) Appl. No.: 17/788,588

(22) PCT Filed: Feb. 10, 2021

(86) PCT No.: PCT/US2021/017361
§ 371 (c)(1),
(2) Date: Jun. 23, 2022

(87) PCT Pub. No.: WO2021/163119
PCT Pub. Date: Aug. 19, 2021

(65) Prior Publication Data
US 2023/0025965 A1    Jan. 26, 2023

Related U.S. Application Data

(60) Provisional application No. 62/972,934, filed on Feb. 11, 2020.

(51) Int. Cl.
*B62D 27/02* (2006.01)
*B29C 44/18* (2006.01)

(52) U.S. Cl.
CPC ............ *B62D 27/026* (2013.01); *B29C 44/18* (2013.01); *B62D 27/023* (2013.01)

(58) Field of Classification Search
CPC .............................. B62D 27/026; B29C 44/18
(Continued)

(56) References Cited

U.S. PATENT DOCUMENTS 5,228,259 A    7/1993  Haddad et al.
5,271,687 A *  12/1993  Holka ................... B62D 27/026
                                                      296/205

(Continued)

FOREIGN PATENT DOCUMENTS

CN      101835677 A  *  9/2010  ............. B29C 44/18
CN      103158790 A      6/2013
(Continued)

OTHER PUBLICATIONS

CN101835677 Text (Year: 2010).*
(Continued)

*Primary Examiner* — Dennis H Pedder
(74) *Attorney, Agent, or Firm* — The Dobrusin Law Firm, P.C.

(57) ABSTRACT

The present teachings generally relate to a structural reinforcement, a body member comprising the structural reinforcement, and a method of using the structural reinforcement. The structural reinforcement comprises a first wall, a second wall extending from a first side of the first wall. Spacer legs extend from a second side of the first wall and define a first channel Spacer legs extend from a second side of the second wall and define a second channel. The structural reinforcement is configured to reinforce a joint.

20 Claims, 3 Drawing Sheets

(58) Field of Classification Search
USPC .................................. 296/187.02, 29, 30
See application file for complete search history.

(56) References Cited

U.S. PATENT DOCUMENTS

| | | | |
|---|---|---|---|
| 5,275,853 A | 1/1994 | Silvis et al. | |
| 5,464,924 A | 11/1995 | Silvis et al. | |
| 5,884,960 A | 3/1999 | Wycech | |
| 5,962,093 A | 10/1999 | White et al. | |
| 6,348,513 B1 | 2/2002 | Hilborn et al. | |
| 6,368,438 B1 | 4/2002 | Chang et al. | |
| 6,811,864 B2 | 11/2004 | Czaplicki et al. | |
| 7,125,461 B2 | 10/2006 | Czaplicki et al. | |
| 7,249,415 B2 | 7/2007 | Larsen et al. | |
| 8,414,068 B1 * | 4/2013 | Na ................ | B62D 27/023 296/193.06 |
| 8,707,534 B2 | 4/2014 | Apfel | |
| 8,931,173 B2 | 1/2015 | Larsen et al. | |
| 10,106,205 B2 | 10/2018 | Richardson et al. | |
| 11,124,678 B2 | 9/2021 | Chopin | |
| 2003/0001469 A1 | 1/2003 | Hankins et al. | |
| 2004/0076831 A1 | 4/2004 | Hable et al. | |
| 2004/0204551 A1 | 10/2004 | Czaplicki et al. | |
| 2004/0232686 A1 | 11/2004 | Locke | |
| 2007/0001073 A1 | 1/2007 | Gibson | |
| 2017/0021871 A1 | 1/2017 | Kumar et al. | |
| 2018/0273804 A1 * | 9/2018 | Meistermann ............ | C09J 5/10 |
| 2019/0308357 A1 | 10/2019 | Larsen et al. | |

FOREIGN PATENT DOCUMENTS

| | | |
|---|---|---|
| CN | 207725498 U | 8/2018 |
| CN | 109455229 A | 3/2019 |
| DE | 2701905 A1 | 7/1978 |
| DE | 4202391 A1 | 8/1993 |
| DE | 9117204 U1 | 4/1997 |
| EP | 0309358 A | 3/1989 |
| EP | 0568213 A1 | 11/1993 |
| EP | 0638460 A1 | 2/1995 |
| WO | 85/05337 A1 | 12/1985 |
| WO | 86/05224 A1 | 9/1986 |
| WO | 2020/033393 A1 | 2/2020 |

OTHER PUBLICATIONS 40 x Universal Corner Brace/Furniture Joint Connector/Angle Bracket with closable Attached Cover | Sossai® BTI, 4 Fixing Holes | Colour. Brown | Material: Plastic: Amazon.co.uk: DIY & Tools Author:Anonymous Publication data:Feb. 10, 2020 URL.https://www.amazon.co.uk/Universal-Furniture-Connector-closable-attached/dp/B07BFWXRHN.
International Search Report and Written Opinion dated May 26, 2021, for International Application PCT/US2021/017361.
Chinese Office Action, CN Application No. 202180006752.7 dated Feb. 21, 2024.
Chinese First Search, CN Application No. 202180006752.7 dated Feb. 21, 2024.

* cited by examiner

EXPOSED STRUCTURAL CORNER REINFORCEMENT

FIELD

The present teachings generally relate to a structural reinforcement and method of using the structural reinforcement.

BACKGROUND

Vehicles often endure various loads during use. It may be advantageous to structurally reinforce components of vehicles to prevent loads from deforming or damaging the vehicle.

Vehicles and sub-structures thereof often include joints, which are susceptible to damage and/or deformation when various loads are exerted upon the joints. Vehicles may comprise a plurality of joints that must be assembled and reinforced consistently, in a high-throughput manufacturing process.

Conventionally, joints may be assembled and reinforced by welding (e.g., SMAW, MIG, or TIG). However, welding presents several technical challenges such as the time it takes to form a single weld, the costs associated with labor, and the potential for human error.

Structures that reinforce internal corner sections and are known. See, for example, U.S. Patent Publication Nos. 2003/0001469 and 2007/0001073, incorporated herein by reference for all purposes. However, it would be advantageous to provide an external structural reinforcement that may be implemented, in place of welding, to the effect of standardizing the construction of joints (i.e., managing inconsistencies), reducing labor costs, providing for higher throughput (i.e., the volume of articles passing through the manufacturing process), and reducing cycle time (i.e., time it takes for a single article to finish the manufacturing process).

SUMMARY

The present teachings relate to a structural reinforcement, which may address at least some of the needs identified above, the structural reinforcement comprising: a first wall, a second wall extending from a first side of the first wall, one or more spacer legs extending from a second side of the first wall and defining a first channel, one or more spacer legs extending from a second side of the second wall and defining a second channel, wherein the structural reinforcement is configured to reinforce a joint.

The structural reinforcement may comprise a curable adhesive. The curable adhesive may be disposed in the first channel, the second channel, or both. The structural reinforcement may comprise a third wall coupled to and extending between the first wall and the second wall. The third wall may be perpendicular to the first wall, the second wall, or both. The curable adhesive may be disposed on the third wall. The curable adhesive may comprise one or more of a polyvinyl butyral, thermoplastic epoxy, epoxy-elastomer adduct, or any combination thereof. The curable adhesive may be a heat-activated epoxy.

The structural reinforcement may comprise an opening on the first wall, the second wall, the third wall, or any combination thereof. The opening may accept a fastener. The fastener may extend through the opening and fasten the structural reinforcement to the joint.

The one or more spacer legs may be coupled to one or more edges of the first wall, the second wall, or both.

The structural reinforcement may comprise one or more base materials, one or more reinforcement components, or both. The one or more base materials may be selected from a polyamide, a polyester, a polypropylene, a polyethylene, a polysulfone, a thermoplastic imide, a polyether imide, a polyether sulfone, or any combination thereof.

The structural reinforcement may be located on two interfacing surfaces of the joint. The structural reinforcement may be located on three interfacing surfaces of the joint.

The second wall may be arranged perpendicular to the first wall. The second wall may be coupled to an edge of the first wall.

The one or more spacer legs of the first wall, the one or more spacer legs of the second wall, or both may include two spacer legs coupled to opposing edges of the first wall, the second wall, or both.

The present teachings further relate to a vehicle body member, which may address at least some of the needs identified above, the vehicle body member comprising: a joint, and a structural reinforcement comprising: a first wall, a second wall extending from a first side of the first wall, one or more spacer legs extending from a second side of the first wall and defining a first channel, one or more spacer legs extending from a second side of the second wall and defining a second channel.

The structural reinforcement may comprise a curable adhesive. The curable adhesive may be disposed in the first channel, the second channel, or both. The structural reinforcement may comprise a third wall coupled to and extending between the first wall and the second wall. The third wall may be perpendicular to the first wall, the second wall, or both. The curable adhesive may be disposed on the third wall. The curable adhesive may comprise one or more of polyvinyl butyral, thermoplastic epoxy, epoxy-elastomer adduct, or any combination thereof. The curable adhesive may be a heat-activated epoxy.

The structural reinforcement may comprise an opening on the first wall, the second wall, the third wall, or any combination thereof. The opening may accept a fastener. The fastener may extend through the opening and fasten the structural reinforcement to the joint.

The one or more spacer legs may be coupled to one or more edges of the first wall, the second wall, or both.

The structural reinforcement may comprise one or more base materials, one or more reinforcement components, or both. The one or more base materials may be selected from a polyamide, a polyester, a polypropylene, a polyethylene, a polysulfone, a thermoplastic imide, a polyether imide, a polyether sulfone, or any combination thereof.

The structural reinforcement may be located on two interfacing surfaces of the joint. The structural reinforcement may be located on three interfacing surfaces of the joint.

The second wall may be perpendicular to the first wall. The second wall may be coupled to an edge of the first wall.

The one or more spacer legs of the first wall, the one or more spacer legs of the second wall, or both may include two spacer legs coupled to opposing edges of the first wall, the second wall, or both.

The present teachings also relate to a method of using the structural reinforcement of the present disclosure, which may address at least some of the needs identified above, the method comprising: applying a curable adhesive to the structural reinforcement, locating the structural reinforcement on the joint, and heating the curable adhesive.

The method may further include fastening the structural reinforcement to the joint with a fastener extending through both an opening in the structural reinforcement and an opening in the joint. The method may further include curing the curable adhesive at a temperature range of between about 82° C. to about 193° C. A vehicle body member may comprise the joint.

DESCRIPTION

The present teachings meet one or more of the above needs by the improved article and method of use described herein. The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The present disclosure relates to a structural reinforcement. The structural reinforcement may be employed on vehicles, buildings, furniture, containers (e.g., shipping containers), or any combination thereof. In one aspect, the structural reinforcement may be installed in and/or on a vehicle. The structural reinforcement may be installed on one or more body members of the vehicle. The vehicle may include personal vehicles, commercial vehicles, or both. Personal vehicles may include coups, sedans, mini-vans, mid-size SUV's, full-size SUV's, pickup trucks, the like, or any combination thereof. Commercial vehicles may include but are not limited to light trucks (e.g., utility vehicles and service vehicles), medium trucks (e.g., flatbed trucks and box trucks), heavy trucks (e.g., semi-trucks), or any combination thereof. The body members may include doors, fenders, bumpers, hoods, roofs, mirrors, trunks, tailgates, pillars, panels, cross-members, rails, sills, bulkheads, battery trays, interior door panels, dashboard covers, center consoles, seats, the like, or any combination thereof. The battery trays may include those used in combustion engine vehicles, electric vehicles (EV's), or both. The vehicles may comprise a plurality of repeating units ("segments") of body members. As a non-limiting example, service trucks may comprise bodies having a plurality of perpendicularly intersecting pillars extending vertically and rails extending horizontally, that assemble to form a plurality of compartments. The compartments may store tools, equipment, the like, or any combination thereof. The structural reinforcement may be particularly advantageous when implemented in vehicles having a plurality of identical joints, similarly dimensioned joints, or both, so the configuration of the structural reinforcement is generally the same. The structural reinforcement may be provided in various configurations to complement various types of joints. The configurations, as will become apparent throughout this specification, relate to the physical dimensions of the structural reinforcement's individual elements. The physical dimensions may include length, width, thickness, angles, the like, or any combination thereof.

The body members may be fabricated from metal, polymer, or both. The metal may include aluminum, magnesium, titanium, steel, the like, or any combination thereof. The polymer may include polyethylene ("PE"), polyurethane ("PU"), polypropylene ("PP"), polyvinylchloride ("PVC"), polyamide ("PA"), polycarbonate ("PC"), Polymethylmethacrylate ("PMMA"), thermoplastic epoxy, polyester resin, the like, or any combination thereof. The polymer may be a fiber-reinforced polymer, comprising continuous and/or chopped fibers. The fibers may comprise a woven or non-woven mat. The fibers may be selected from glass fiber, carbon fiber, aramid fiber, or some combination thereof. The body members may be arranged together in one or more configurations that are intersecting, interfacing, or both. The configurations may form and/or define one or more joints. The joints may be formed and/or defined, by the intersection, interface, or both of two or more body members. The joint may include two or more surfaces, which may be referred to herein as "joint surfaces". The surfaces may be associated with their respective body members forming the joint. Joint surfaces may intersect and/or interface with other joint surfaces. The joint surfaces may include adjacent surfaces, opposing surfaces, or both. The adjacent surfaces may interface at the joint. The adjacent surfaces may be oriented at any angle from one other. The angle may be about 10° or more, 20° or more, 40° or more, 60° or more, or even 80° or more. The angle may be about 180° or less, 160° or less, 140° or less, 120° or less, or even 100° or less. For example, a first and second body member may abut at a joint and a surface of the first body member may be oriented perpendicular to a surface of the second body member. Opposing surfaces may include generally parallel surfaces spaced from each other. The body members may include one or more openings. The openings may accept a fastener. The fastener may extend through both a reinforcement element and a body member.

The vehicle may include one or more structural reinforcements. The structural reinforcement may function to impart structure, strength, reinforcement, or any combination thereof to the vehicle. The structural reinforcement may be employed to reinforce a structure against a variety of forces (loads) which may be exerted by a variety of sources. The sources may include but are not limited to forces from the impact of the vehicle with another object, forces and vibrations caused by terrain conditions across which a vehicle may be traveling, forces exerted by wind resistance, forces exerted by cargo (e.g., equipment, luggage, passengers, etc.) contained in and/or on the vehicle, the like, or any combination thereof. The structural reinforcement may be installed in and/or on a joint of the vehicle. The structural reinforcement may be mechanically fastened, chemically fastened, or both to a joint. Mechanically fasten may refer to welding, the use of fasteners, or both. The fasteners may include bolts, screws, rivets, push pins, the like, or any combination thereof. Chemically fasten may refer to the use of adhesives. The adhesives may include curable epoxy, polyurethane, polyimide, cyanoacrylate, phenol, methacrylate, the like, or any combination thereof. The adhesive may be a one part or two-part adhesive. The adhesive may be cured by the addition of a stimulus. The adhesive may cure upon combination of two parts of the adhesive. The structural reinforcement may exhibit a handedness. The handedness may determine whether the structural reinforcement is configured for use on either a right side of the vehicle, a left side of the vehicle, an upward-facing joint, a downward facing joint, or any combination thereof. As referred to herein, upward may refer to a joint facing away from the ground on which the vehicle is situated; and downward may refer to a joint facing toward the ground on which the vehicle is situated. The structural reinforcement may be configured for use on one type of joint or more than one type of joint.

The structural reinforcement may include one or more walls. The walls may function to interface with and/or brace against adjacent, interfacing, and/or intersecting body members. Each of the walls may form a complementary fit with a corresponding joint surface. A complementary fit may refer to a wall having a corresponding length, width, curvature, flatness, or any combination thereof with a joint surface. The walls may interface directly with the surfaces of the joint, indirectly with the surfaces of the joint, or both. A direct interface may refer to direct contact between a second side of a wall and joint surface. The direct interface may include a flush interface. An indirect interface may refer to an element disposed between a wall and joint surface. The element, as will become apparent throughout this specification, may include spacer legs, a curable adhesive, or both. The walls may be generally planar. The walls may be curved. The walls may comprise two opposing sides. The walls may comprise a first side oriented away from the joint surface and a second side oriented toward the joint surface. The first side and the second side may be generally parallel to each other. The first side and/or second side may be configured to accept a curable adhesive thereon. The first side and/or second side may be textured, surface treated, or both so that adequate adhesion is provided for a curable adhesive. The walls may be any shape and/or profile including, but not limited to, a triangle, parallelogram, trapezoid, or the like. The parallelogram may include a rhombus, rectangle, square, the like, or any combination thereof. The walls may have dimensions that are generally equal to, smaller than, or even larger than the dimensions of a joint. The dimensions may include length, width, thickness, or any combination thereof. The length and/or width of the walls may be about 2 cm or more, 4 cm or more, 6 cm or more, 8 cm or more, or even 10 cm or more. The length and/or width of the walls may be about 20 cm or less, 18 cm or less, 16 cm or less, 14 cm or less, or even 12 cm or less. The thickness of the walls may depend on the expected quantity and/or magnitude of the forces acting on the joint, duration of the forces acting on the joint, persistence of the forces acting on the joint, or any combination thereof. It may be particularly advantageous for a utility vehicle to have structural reinforcements with thicker walls, as compared to a structural reinforcement for a personal vehicle, because utility vehicles commonly carry heavier loads as compared to a personal vehicle. The thickness may be defined by the distance between the first side and the second side of the walls. The walls may have a thickness of about 1 mm or more, 2 mm or more, 3 mm or more, or even 4 mm or more. The walls may have a thickness of about 1 cm or less, 8 mm or less, 7 mm or less, 6 mm or less, or even 5 mm or less. A wall may have a generally equal or different thickness as any other wall. The wall may have a uniform thickness or a varying thickness across its length, width, or both. The walls may comprise at least a first wall and a second wall. The first wall and the second wall may be oriented, with respect to each other, at any angle between 0° and 180°. The angle may be about 10° or more, 20° or more, 40° or more, 60° or more, or even 80° or more. The angle may be about 180° or less, 160° or less, 140° or less, 120° or less, or even 100° or less. The first wall and second wall may be coupled at an edge of the first wall, an edge of the second wall, or both. The first wall and second wall may be coupled adjacent an edge of the first wall, adjacent an edge of the second wall, or both. The first wall and the second wall may be coupled at any portion intermediate to the edges of the first wall, the edges of the second wall, or both. The first wall and the second wall may be coupled on the first side of the first wall, the first side of the second wall, or both. For example, the second wall may extend perpendicularly from an edge of the first side of the first wall. The second wall may extend from a first side of the first wall, or vice versa.

The structural reinforcement may comprise a third wall, fourth wall, or both. The third wall, fourth wall, or both may function to brace the first wall against the second wall (or vice versa) so that physical warping—caused by forces applied to the first wall, second wall, or both—is mitigated or substantially avoided. For example, where a structural reinforcement comprises a second wall extending perpendicularly from an edge of a first wall, forces that tend to move either of the walls toward each other may result in bending (i.e., physical warping) of the structural reinforcement about the edge. A third wall extending from the first wall to the second wall may avoid bending of the first wall and the second wall toward each other. The third wall, fourth wall, or both may be coupled to the first wall, the second wall, or both. The third wall, fourth wall, or both may extend between and/or from edges, or a portion thereof, of the first wall, second wall, or both. The third wall, fourth wall, or both may extend from a portion of the first wall and or second wall anywhere between the edges thereof. The third wall, fourth wall, or both may be perpendicular to the first wall, second wall, or both. The third wall, fourth wall, or both may be oriented at an acute angle from the first wall, second wall, or both. The angle may be about 10° or more, 20° or more, 40° or more, 60° or more, or even 80° or more. The angle may be about 180° or less, 160° or less, 140° or less, 120° or less, or even 100° or less. The third wall, fourth wall, or both may have a first side, a second side, or both. The third wall, fourth wall, or both may contact the first wall, second wall, or both on the first respective sides of the third wall, fourth wall, or both. The third wall, fourth wall, or both may contact an edge of the first wall, second wall, or both. The third wall and fourth wall may have an opposing relationship. For example, the third wall may extend between and/or from an edge of the first wall and second wall, and the fourth wall may extend between and/or from an opposing edge of the first wall and second wall. The third wall may be adjacent to the fourth wall. The walls may be any shape and/or profile including, but not limited to, a triangle, parallelogram, trapezoid, or the like. The parallelogram may include a rhombus, rectangle, square, the like, or any combination thereof. The third wall, fourth wall, or both may include elongate structures. The elongate structures may include rods, bars, beams, the like, or any combination thereof. For example, a third wall may include a rod, one end of the rod being coupled to the first wall and the other end of the rod being coupled to the second wall. The structural reinforcement may include more than four walls. As a non-limiting example, the structural reinforcement may include a cuboid structure having six walls. The number of walls included in a structural reinforcement may depend on the number of corresponding joint surfaces. The structural reinforcement may include one wall for every one joint surface. The structural reinforcement may have more or fewer walls than joint surfaces. The number of the walls included in a structural reinforcement may depend on the expected quantity and/or magnitude of the forces acting on the joint, duration of the forces acting on the joint, regularity of the forces acting on the joint, or any combination thereof. It may be particularly advantageous for a utility vehicle to have structural reinforcements with more walls, as compared to a structural reinforcement for a personal vehicle, because utility vehicles commonly carry heavier loads as compared to a personal vehicle.

The structural reinforcement may include one or more spacer legs. The spacer legs may function to distance the walls away from the surfaces of the joint and/or define one or more channels, discussed in further detail below. The spacer legs may be integrally formed on one or more walls, coupled to one or more walls, or both. The spacer legs may comprise a portion of a wall extending beyond a second side of an adjacent wall. The spacer legs may be mechanically coupled, chemically coupled, or both to one or more walls. The spacer legs may extend from one or more of the walls. One or more spacer legs may extend from a wall. It may be particularly advantageous for two spacer legs to extend from a wall to provide the wall with a stable support against a joint surface. The spacer legs may extend from the second side of the walls. The spacer legs may extend from edges of the walls. The spacer legs may extend along a full length of a wall or at least a portion thereof. The spacer legs may extend from any portion intermediate to the edges of the walls. Two or more spacer legs may be adjacent or parallel to each other. The spacer legs may extend at an angle, between 0° and 180°, from the walls. The angle may be about 10° or more, 20° or more, 40° or more, 60° or more, or even 80° or more. The angle may be about 180° or less, 160° or less, 140° or less, 120° or less, or even 100° or less. The spacer legs may extend perpendicularly from the walls. The spacer legs may extend a distance from the walls. The distance may be about 1 mm or more, 2 mm or more, 3 mm or more, or even 4 mm or more. The distance may be about 2 cm or less, 1 cm or less, 8 mm or less, 7 mm or less, 6 mm or less, or even 5 mm or less. The spacer legs may extend from a second side of a wall and define a channel.

The structural reinforcement may include one or more channels. The channels may function to accept a curable adhesive. The curable adhesive may fill a volume of the channel or at least a portion thereof. The curable adhesive may be disposed as one or more strips within a channel. The strips may have a volume that is less than the channel. The strips may be located adjacent to a spacer leg. The strips may be located anywhere between spacer legs, edges of the walls, or both. The channels may be included on any of the walls. The channels may have a depth defined by the distance between a wall and joint surface, the length of the spacer legs, or both. The depth may be about 1 mm or more, 2 mm or more, 3 mm or more, or even 4 mm or more. The depth may be about 2 cm or less, 1 cm or less, 8 mm or less, 7 mm or less, 6 mm or less, or even 5 mm or less.

The structural reinforcement may include one or more openings. The opening may function to accept a fastener, secure the structural reinforcement to a joint, or both. The opening may extend through one or more walls. The opening may be located on one or more walls. One or more openings may be located on any single wall. One or more walls may be free of an opening. The opening may be located on any portion of a wall. The opening may be located between edges of a wall. The opening may be located generally centered on a wall. A fastener may be employed to fasten the structural reinforcement to the joint, keep the structural reinforcement in place prior to the curable adhesive curing, during the curable adhesive curing, after the curable adhesive cures, or any combination thereof.

The structural reinforcement may be fabricated from one or more base materials. The base material may include metal, polymer, or both. The metal may include aluminum, magnesium, titanium, steel, or any combination thereof. The polymer may include polyamide (e.g., nylon 6 or nylon 6,6), polyester, polyurethane, polypropylene, polyethylene, polysulfone, thermoplastic imide, polyether imide, polyether sulfone, thermoplastic epoxy, or any combination thereof. In one aspect, the structural reinforcement comprises polyamide. The polymer may be fiber-reinforced. The base materials may be present in the structural reinforcement in an amount of about 25% or more, 35% or more, or even 55% or more, by weight of the structural reinforcement. The base materials may be present in the structural reinforcement in an amount of about 95% or less, 85% or less, 75% or less, or even 65% or less, by weight of the structural reinforcement.

The structural reinforcement may comprise one or more reinforcement components. The reinforcement component may function to impart strength and/or impact resistance (physical characteristics) to the structural reinforcement. The reinforcement component may improve a first physical characteristic while simultaneously substantially avoiding any significant detrimental effect to a second physical characteristic. The reinforcement component may improve the modulus of the structural reinforcement while still having minimal detrimental effect on strain-to-failure. The reinforcement component may be generally non-reactive with the base material present in the reinforcement component. The reinforcement component may be selected from mineral reinforcements, glass beads, glass bubbles, glass fibers, aramid fibers (e.g., Kevlar®), carbon fibers, ceramic fibers, nylon fibers, the like, or any combination thereof. The mineral reinforcement may include wollastonite, pyrophyllite, sauconite, saponite, nontronite, montmorillonite, silica, calcium, diatomaceous earth, clay (e.g., including nanoclay). Structural reinforcement having reinforcement components may be referred to as "filled". In one aspect, the structural reinforcement may include glass-filled polyamide. The fiber reinforcement may be present in the structural reinforcement in an amount of about 15% or more, about 25% or more, about 35% or more, or even about 45% or more, by weight of the structural reinforcement. The fiber reinforcement may be present in the structural reinforcement in an amount of about 85% or less, 75% or less, 65% or less, or even 55% or less, by weight of the structural reinforcement.

The walls, spacer legs, channels, or any combination thereof may accept a curable adhesive. The curable adhesive may be referred to as an "activatable material", as discussed further herein. The curable adhesive may be applied to any of the walls, spacer legs, channels, any portions thereof, or any combination thereof. The curable adhesive may be applied to a second side of a wall, oriented toward and/or interfacing with a joint surface. The curable adhesive may be applied to the walls through processes such as extruding, dispensing, taping (e.g., where the curable adhesive is provided as a solid at about room temperature), or any combination thereof. The curable adhesive may be applied to the walls upon manufacturing the structural reinforcement, before applying the structural reinforcement to the joint, or at any point in time therebetween.

As used herein, "activatable material" may include any material that may be activated to melt, flow, cure (e.g., thermoset), expand, foam, develop adhesion, or any combination thereof, by an ambient condition or another condition. The ambient condition may include any temperature between and inclusive of 20° C. to 25° C. The other condition may include heat, pressure, moisture, UV light, chemical exposure, or any combination thereof. The activatable material may be heat-activated at temperatures typical of the curing process following priming, painting, electrodeposition coating ("E-coat"), or any combination thereof. The temperature following priming, painting, electrodeposition, or any combination thereof may be between about 82° C. to about 193° C. The activatable material may cure at room temperature (e.g., 20-25° C.) upon locating the adhesive onto the reinforcement as a result of contact with an initiator or combination of two-components of a two-component adhesive.

The activatable material may be referred to herein as a curable adhesive or heat-activated adhesive. The activatable material may include one or more of: polyvinyl butyral, thermoplastic epoxy, epoxy-elastomer adduct, adducted carboxyl-terminated polymer, or any combination thereof. The activatable material may further include one or more of: a base resin, phenoxy resin, polymeric particle, flexibilizer, blowing agent, additional polymers, curing agent, curing agent accelerator, reinforcement component, filler, other additives, or any combination thereof. Example formulations are disclosed in PCT Application No. PCT/US2019/045285, incorporated herein by reference for all purposes. The activatable material may include a phosphate ester activation component.

The activatable material may include one or more polymers. The polymer may function to assist in providing desirable physical properties to the activatable material, especially when used in combination with a core-shell polymer, epoxy-elastomer adduct, or both. The polymer may function to impart increased strength, increased strain-to-failure, increased volumetric expansion during activation, improved balance between Young's modulus (as measured by ASTM D638) and strain-to-failure, improved balance between volumetric expansion during activation and Young's modulus, decreased tackiness of the activatable material in its green state, or any combination thereof. The Young's modulus and strain to failure may be increased simultaneously or at least one may be increased while the other is maintained. The volumetric expansion during activation and Young's modulus may be increased simultaneously or at least one is increased while the other is maintained. As referred to herein, green state may mean prior to subjecting the activatable material to curing conditions. The polymer may be present in the activatable material in an amount of about 5% or more, 10% or more, or even 15% or more, by weight of the activatable material. The polymer may be present in the activatable material in an amount of about 30% or less, 25% or less, or even 20% or less, by weight of the activatable material. A non-limiting example of a suitable polymer may include the PVB resin sold under the designation B08HX, commercially available from Chang Chun Group (CCP).

The activatable material may include one or more thermoplastic epoxies. The thermoplastic epoxy may be a reaction product of one or more thermoplastic polyethers. The thermoplastic polyethers and/or thermoplastic epoxies may function to impart thermal flow properties, as measured by melt flow index ("MFI"), to the activatable material. The thermoplastic polyethers and/or thermoplastic epoxies may have an MFI of between about 1 and about 300 grams per 10 minutes for samples weighing 2.16 kg at a temperature of about 190° C. The thermoplastic epoxy may be included in the activatable material in an amount of about 1% or more, 5% or more, 10% or more, 20% or more, or even 30% or more, by weight of the activatable material. The thermoplastic epoxy may be included in the activatable material in an amount of about 90% or less, 80% or less, 70% or less, 60% or less, or even 50% or less, by weight of the activatable material. Examples of suitable thermoplastic polyethers and/or thermoplastic epoxies include, without limitation, polyetheramines, poly(amino ethers), copolymers of monoethanolamine or other monoamines and a diglycidyl ether, the like, or any combinations thereof. Non-limiting examples of preferred thermoplastic polyethers and/or thermoplastic epoxies and their methods of formation are disclosed in U.S. Pat. Nos. 5,275,853; 5,464,924; and 5,962,093, incorporated herein by reference for all purposes.

The thermoplastic epoxies typically include pendant hydroxyl moieties, pendant aromatic ether/amine repeating units, or both. Pendant moieties may refer to moieties attached to a polymeric backbone chain. The thermoplastic epoxy may be formed by reacting a primary amine (e.g., monoethanolamine), a bis(secondary) diamine, a cyclic diamine, the like, or any combination thereof with a diglycidyl ether. The thermoplastic epoxy may be formed by reacting an amine with an epoxy-functionalized poly(alkylene oxide) to form a poly(amino ether). The thermoplastic epoxy may be prepared by reacting a difunctional amine with a diglycidyl ether or diepoxy-functionalized poly(alkylene oxide) under conditions sufficient to cause the amine moieties to react with the epoxy moieties to form a polymer backbone having amine linkages, ether linkages, and pendant hydroxyl moieties. Optionally, the polymer may be treated with a monofunctional nucleophile, which may be a primary amine or secondary amine. Additionally, it is contemplated that amines (e.g., cyclic amines) with one reactive group (e.g., one reactive hydrogen) may be employed for forming the thermoplastic polyether. Advantageously, the amines may assist in controlling the molecular weight of the thermoplastic ether formed based on the stoichiometric ratio choice for the reactive monomers.

The activatable material may include one or more epoxy/elastomer adducts ("adduct"). The adduct may function to modify structural properties of the activatable material such as strength, strain-to-failure, peel resistance, adhesion durability, uncured-material integrity (i.e., less likely to stick, break, or deform before use), stiffness, impart a plasticization effect to the activatable material (i.e., the ability of the activatable material to plasticly deform), phase separate during cure to produce discrete elastomeric particles that are effective for improving fracture toughness (G1c) and impact resistance of the activatable material, or any combination thereof. The epoxy/elastomer adduct may be used together with a polymeric particle, such as methacrylate-butadiene-styrene ("MBS"), polyvinyl butyral ("PVB"), or both, which may achieve desirable adhesive performance and physical properties over a wide range of temperatures, even when employing a relatively small amount of the adduct. The epoxy/elastomer adduct may be included in the activatable material in an amount of about 5% or more, 10% or more, 15% or more, or even 20% or more, by weight of the activatable material. The epoxy/elastomer adduct may be included in the activatable material in an amount of about 75% or less, 70% or less, 65% or less, or even 60% or less, by weight of the activatable material. The epoxy/elastomer adduct may include about 1:5 to 5:1 parts of epoxy to elastomer, and more typically about 1:3 to 3:1 parts of epoxy to elastomer. The adduct may include elastomer in an amount of about 10% or more, 20% or more, or even 30% or more, by weight of the epoxy/elastomer adduct. The adduct may include elastomer in an amount of 60% or less, 50% or less, or even 40% or less, by weight of the epoxy/elastomer adduct. Various epoxy/elastomer adducts may be employed in the present teachings. The adduct may be a solid adduct (i.e., solid at room temperature), a liquid adduct (i.e., liquid at room temperature), a semisolid adduct (i.e., semi-solid at room temperature), or any combination thereof. As referred to herein, room temperature may include any temperature between and inclusive of 20° C. to 25° C. The elastomer may include, without limitation, natural rubber, styrene-butadiene rubber, polyisoprene, polyisobutylene, polybutadiene, isoprene-butadiene copolymer, neoprene, nitrile rubber (e.g., a butyl nitrile, such as carboxy-terminated butyl nitrile ("CTBN")), butyl rubber, polysulfide elastomer, acrylic elastomer, acrylonitrile elastomers, silicone rubber, polysiloxanes, polyester rubber, diisocyanate-linked condensation elastomer, ethylene-propylene diene monomer ("EPDM") rubber, chlorosulphonated polyethylene, fluorinated hydrocarbons and the like. Preferably, the elastomer is carboxy-terminated butyl nitrile. Carboxy-terminated butyl nitrile and adducts thereof are particularly useful developing adhesion to contaminated surfaces, especially with stamping lubricants typical to the automotive industry.

The activatable material may include one or more base epoxy resins. A base epoxy resin may function to increase the adhesion, adhesion durability, flow properties, or any combination thereof, of the activatable material. The epoxy resin may further act as component to a crosslinking network upon cure of the activatable material. The base epoxy resin may be included in the activatable material in an amount of about 1% or more, 5% or more 10% or more, or even 20% or more, by weight of the activatable material. The base epoxy resin may be included in the activatable material in an amount of about 75% or less, 70% or less, 65% or less, or even 50% or less, by weight of the activatable material. Non-limiting examples of suitable epoxy resins may include phenolic resin (e.g., novolac type or other type resin), bisphenol-A ("BPA") epichlorohydrin ether polymer, BPA epoxy resin modified with butadiene or another polymeric additive, bisphenol-F-type ("BPF") epoxy resins, or any combination thereof. Moreover, various mixtures of several different epoxy resins may be employed as well. The epoxy resins may include silane modified epoxy resins or silicone free epoxy resins. For example, a silane modified epoxy resin may aid in allowing the activatable material to adhere to metal, such as to aluminum. The epoxy resins may be pre-reacted with carboxylic acid group-containing molecules.

The material may include one or more phenoxy resins. Phenoxy resins may include high molecular weight thermoplastic condensation products of bisphenol-A and epichlorohydrin and derivatives thereof. The phenoxy resins that may be employed may be of the basic formula:

where n is typically from 30 to 100, preferably from 50 to 90. Modified phenoxy resins may also be used. Non-limiting examples of modified epoxy resins may include products marketed by lnchem Corp. Non-limiting examples of suitable phenoxy resins may include PKHB, PKHC, PKHH, PKHJ, and PKHP, commercially available from Gabriel. Phenoxy resin may be in the form of pellets, powder, or both. Alternatively, phenoxy/polyester hybrids and epoxy/phenoxy hybrids may be used. In order to enhance the production of the activatable material, the phenoxy resin may be supplied to the other components of the activatable material as a solution. While any solvent may be used, a liquid epoxy resin may be used as the solvent to contribute to the adhesive properties upon activation of the activatable material.

The activatable material may include one or more polymeric particles. The polymeric particle may be referred to herein as a core-shell polymer. The polymeric particle may function to improve fracture toughness (G1C), peel resistance, impact resistance, or any combination thereof. The polymeric particle may be compatible with the activatable material. The polymeric particle may comprise a ductile core and a rigid shell. The rigid shell may have a favorable adhesion with the other components of the activatable material. The polymeric particle may be included in the activatable material in an amount of about 4% or more, 7% or more, 10% or more, 13% or more, or even 16% or more, by weight of the activatable material. The polymeric particle may be included in the activatable material in an amount of about 90% or less, 40% or less, 30% or less, or even 20% or less, by weight of the activatable material. The polymeric particle may comprise a substantial portion of a first polymeric material ("first material" or "core material") that may be substantially entirely encapsulated by a second polymeric material ("second material" or "shell material"). The substantial portion may be about 30% or more, 50% or more, or even 70% or more, by weight of the polymeric particle. The core material and the shell material may comprise one or more, two or more, or even three or more polymers that are combined and/or reacted together (e.g., sequentially polymerized), or may be part of separate or same polymeric particle systems. Examples suitable core-shell polymers may include, but are not limited to, those sold under the tradename, Kane Ace, particularly grades sold under the designations MX-257 and M711, commercially available from Kaneka. Other examples of suitable core-shell polymers may include, but are not limited to, those sold under the tradename, Clear Strength, particularly the grade sold under the designation E-950, commercially available from Arkema.

The activatable material may include one or more blowing agents. The blowing agent may include one or more nitrogen containing groups. The nitrogen containing groups may include amides, amines, the like, or any combination thereof. Non-limiting examples of suitable blowing agents may include azodicarbonamide, dinitrosopentamethylenetetramine, 4,4i-oxy-bis-(benzenesulphonylhydrazide), trihydrazinotriazine, N,Ni-dimethyl-N,Ni-dinitrosoterephthalamide, or any combination thereof. The material may include a physical blowing agent, including but not limited to those sold under the designations Expancel® (commercially available from AkzoNobel). The material may include blowing agents, including but not limited to those sold under the designations Cellcom® CF810 (commercially available from Kumyang) and Celogen® 754A (commercially available from CelChem LLC). The material may be manufactured according to the MuCell® process available from Trexel.

The activatable material may include one or more blowing agent accelerators. The blowing agent accelerator may include a metal salt, metal oxide, or both. The metal oxide may include zinc oxide. The blowing agent accelerator may include modified thiazoles, unmodified thiazoles, ureas, imidazoles, or any combination thereof.

The activatable material may include one or more curing agents, curing agent accelerators, or both. The curing agents may function to assist the activatable material cure by crosslinking polymers, epoxy resins, or both; assist to thermoset the activatable material; or both. The curing agent may be chosen from aliphatic amines or adducts thereof, aromatic amines or adducts thereof, amidoamines, polyamides, cycloaliphatic amines, anhydrides, polycarboxylic polyesters, isocyanates, phenol-based resins, or any combination thereof. The phenol-based resins may include phenol novolac resins; cresol novolac resins; copolymers such as those of phenol terpene, polyvinyl phenol, or bisphenol-A formaldehyde copolymers; bishydroxyphenyl alkanes, the like, or any combination thereof. The curing agent may include modified and/or unmodified polyamines/polyamides (e.g., triethylenetetramine, diethylenetriamine tetraethylenepentamine, cyanoguanidine, dicyandiamides, the like, or any combination thereof). The curing agent accelerator may include a modified or unmodified urea (e.g., methylene diphenyl bis urea, an imidazole, or any combination thereof). The curing agent and/or curing agent accelerator may be present in the activatable material in the range of from about 0.001% to about 7%, by weight of the activatable material.

The activatable material may foam upon curing. The activatable material may foam to a volume greater than the activatable material's volume in the green state. The activatable material may foam to a volume of about 5% or more, 20% or more, 50% or more, 100% or more, 200% or more, or even 400% or more, relative to the activatable material's volume in its green state. The activatable material may foam to a volume of about 800% or less, 500% or less, 400% or less, or even 300% or less, relative to the activatable material's volume in its green state. The volume of the activatable material may be less after activation due to curing (e.g., cross-linking) for foamed or un-foamed versions of the activatable material. As used herein, "green state", "unfoamed state", and "unfoamed volume" may refer to a the activatable material before the activatable material is exposed to temperatures that activate the blowing agent.

The activatable material may include one or more additional polymers, which may include, but are not limited to, thermoplastics, elastomers, plastomers, the like, or any combination thereof. For example, and without limitation, additional polymers or copolymers that may be incorporated may include halogenated polymers, polycarbonates, polyketones, urethanes, polyesters, silanes, sulfones, allyls, olefins, styrenes, acrylates, methacrylates, silicones, phenolics, rubbers, polyphenylene oxides, terphthalates, acetates (e.g., ethylene-vinyl acetate ("EVA")), acrylates, methacrylates (e.g., ethylene-methyl acrylate polymer ("EMA")), or any combination thereof. Other potential additional polymers or copolymers may include, without limitation, polyolefin (e.g., polyethylene, polypropylene) polystyrene, polyacrylate, poly(ethylene oxide), poly(ethyleneimine), polyester, polyurethane, polysiloxane, polyether, polyphosphazine, polyamide, polyimide, polyisobutylene, polyacrylonitrile, poly(vinyl chloride), poly(methyl methacrylate), poly(vinyl acetate), poly(vinylidene chloride), polytetrafluoroethylene, polyisoprene, polyacrylamide, polyacrylic acid, polymethacrylate, or any combination thereof.

The present disclosure provides for a method of using a structural reinforcement. The method may comprise one or more of the following steps. Some of the steps may be duplicated, removed, or eliminated, rearranged relative to other steps, combined into one or more steps, separated into two or more steps, or a combination thereof. The method may comprise applying a curable adhesive to a structural reinforcement, locating the structural reinforcement on the joint, and heating the curable adhesive. The curable adhesive may be heated/cured to a temperature of between about 82° C. and about 193° C. The method may include a step of fastening the structural reinforcement to the joint with one or more fasteners extending through both of one or more openings in the structural reinforcement and one or more openings in the joint. The method may include a step of installing the structural reinforcement on the joint of a vehicle. A body member may comprise the joint. The method may include foaming and/or curing the activatable material. The activatable material may be applied to one or more body members and/or one or more structural reinforcements in an unfoamed or partially foamed state. The activatable material may be applied to one or more body members and/or one or more structural reinforcements in an uncured or partially cured state. Upon foaming, the activatable material may fill gaps between the structural reinforcement and the joint. As a non-limiting example, a volume of activatable material may be applied to a channel of a structural reinforcement wherein the channel has a greater volume than that of the activatable material applied and so upon foaming, the activatable material may fill the empty volume of the channel and/or may even exceed the volume of the channel (e.g., activatable material seeping out of the channel). The method may include a step of fabricating a structural reinforcement. The structural reinforcement may be fabricated by pultrusion, injection molding, blow molding, extruding, the like, or any combination thereof. The structural reinforcement may be pultruded and then overmolded with a secondary polymeric material. For example, the structural reinforcement may be a pultruded polyurethane overmolded with a glass fiber reinforced polyamide. An activatable material may be applied to the structural reinforcement during or after these fabrication processes. For example, the structural reinforcement may be co-extruded with an activatable material. As another example, the structural reinforcement may be co-injection molded with an activatable material.

Figure 1:
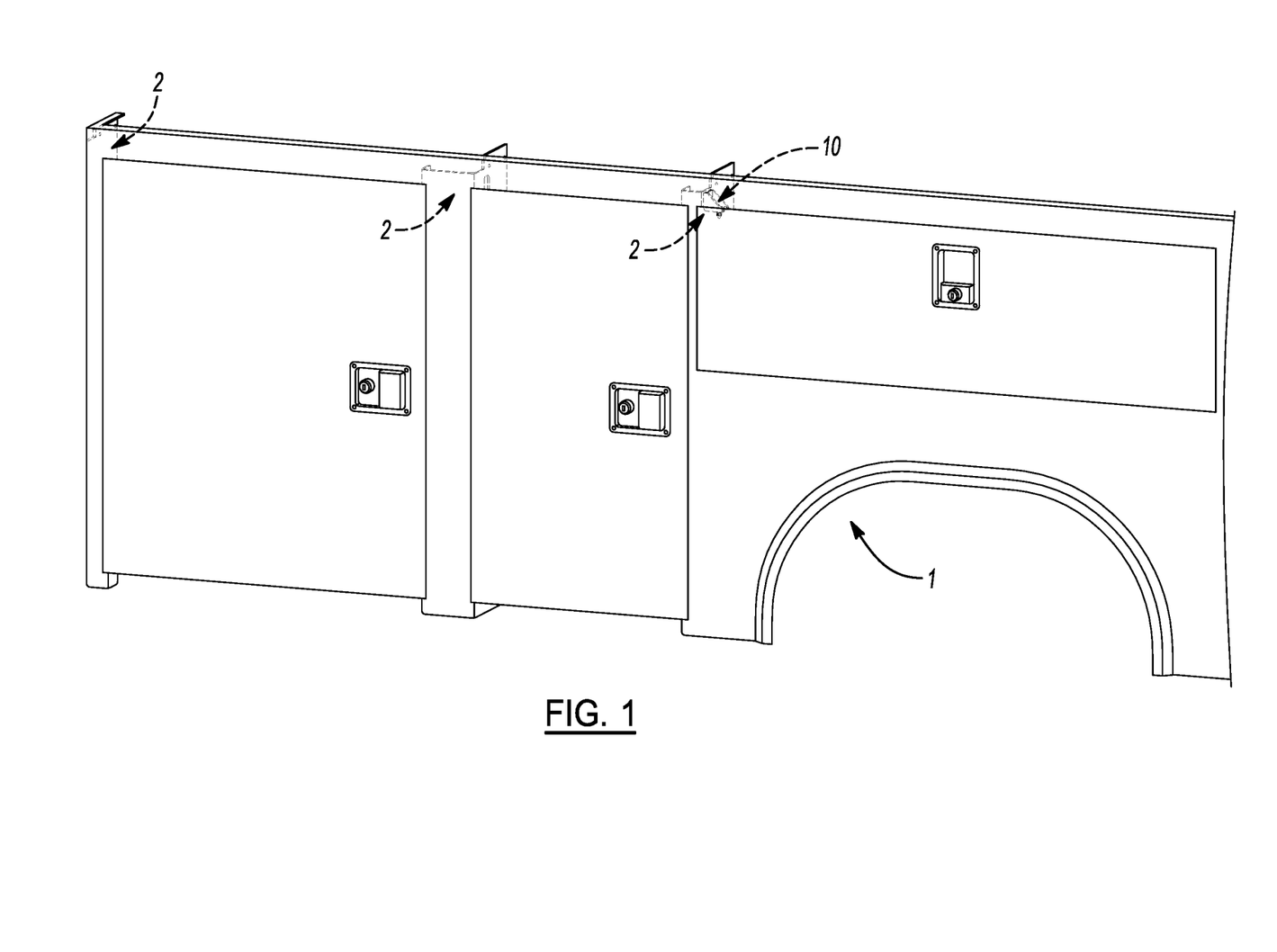
FIG. 1 is a perspective view of a vehicle body member.

FIG. 1 is a perspective view of a vehicle body member 1. The vehicle body member 1 is shown as a side panel of a utility vehicle. The vehicle body member 1 comprises three joints 2 disposed adjacent to a top edge of the side panel along its length. A structural reinforcement 10 is located in one of the three joints 2.

Figure 2:
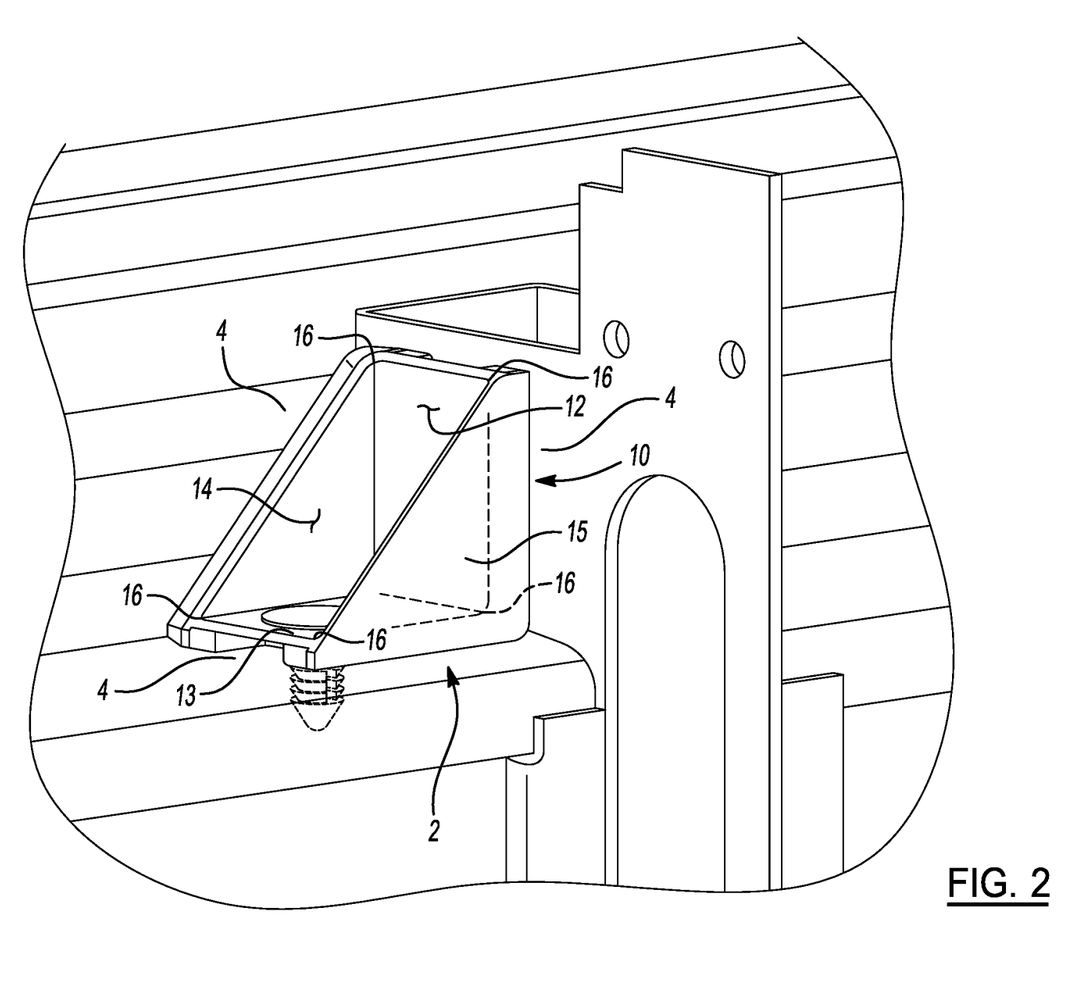
FIG. 2 is a perspective view of a structural reinforcement.

FIG. 2 is a perspective view of a structural reinforcement 10. The structural reinforcement 10 comprises a first wall 12, a second wall 13, a third wall 14, and a fourth wall 15. The structural reinforcement 10 is located on a joint 2. The first wall 12 and second wall 13 are coupled at both of their edges 16. The third wall 14 extends from an edge 16 of the first wall 12 and an edge 16 of the second wall 13. The fourth wall 15 extends from an edge 16 of the first wall 12 and an edge 16 of the second wall 13. The structural reinforcement 10 interfaces three surfaces 4 of the joint 2.

Figure 3:
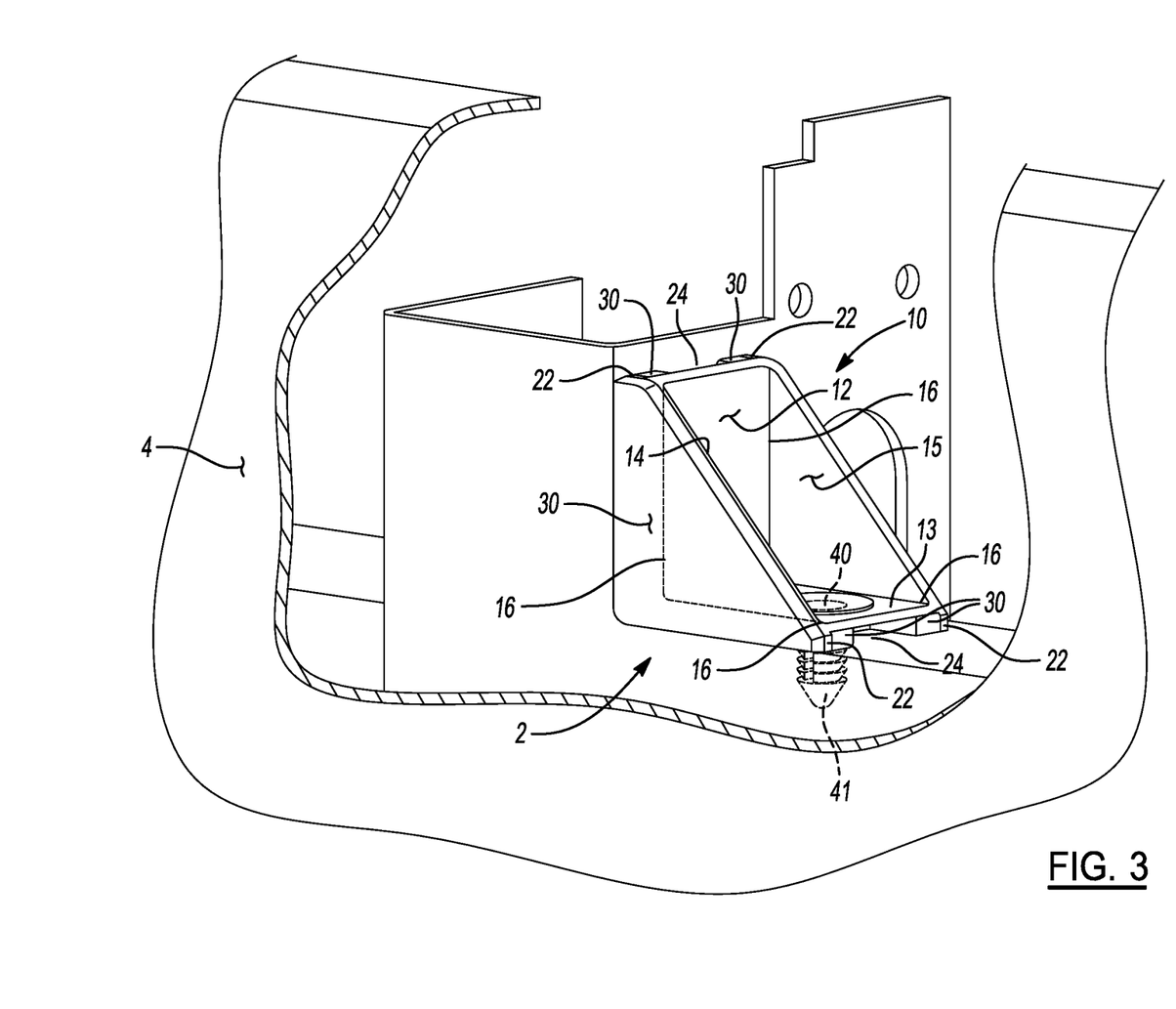
FIG. 3 is a perspective view of the structural reinforcement, as shown in FIG. 2.

FIG. 3 is a perspective view of the structural reinforcement 10, as shown in FIG. 2. The structural reinforcement 10 comprises a first wall 12, a second wall 13, a third wall 14, and a fourth wall 15. The structural reinforcement 10 is located on a joint 2. Spacer legs 22 extend from opposing edges 16 of the first wall 12 and define a channel 24. Spacer legs 22 extend from opposing edges 16 of the second wall 13 and define a channel 24. Curable adhesive 30 is disposed on the third wall 14, between the structural reinforcement 10 and a surface 4 of the joint 2. Curable adhesive 30 is disposed in the channel 24 of the first wall 12, in the form of strips located adjacent the spacer legs 22. Curable adhesive 30 is disposed in the channel 24 of the second wall 13, in the form of strips located adjacent the spacer legs 22. The structural reinforcement 10 comprises an opening 40, extending through the second wall 13. A fastener 41 extends through the opening 40 and engages a surface 4 of the joint 2 to affix the structural reinforcement 10 to the joint 2.

Any numerical values recited in the above application include all values from the lower value to the upper value in increments of one unit provided that there is a separation of at least 2 units between any lower value and any higher value. These are only examples of what is specifically intended and all possible combinations of numerical values between the lowest value and the highest value enumerated are to be considered to be expressly stated in this application in a similar manner. Unless otherwise stated, all ranges include both endpoints and all numbers between the endpoints.

The terms "generally" or "substantially" to describe angular measurements may mean about +/−10° or less, about +/−5° or less, or even about +/−1° or less. The terms "generally" or "substantially" to describe angular measurements may mean about +/−0.01° or greater, about +/−0.1° or greater, or even about +/−0.5° or greater. The terms "generally" or "substantially" to describe linear measurements, percentages, or ratios may mean about +/−10% or less, about +/−5% or less, or even about +/−1% or less. The terms "generally" or "substantially" to describe linear measurements, percentages, or ratios may mean about +/−0.01% or greater, about +/−0.1% or greater, or even about +/−0.5% or greater.

The term "consisting essentially of" to describe a combination shall include the elements, ingredients, components, or steps identified, and such other elements ingredients, components or steps that do not materially affect the basic and novel characteristics of the combination. The use of the terms "comprising" or "including" to describe combinations of elements, ingredients, components, or steps herein also contemplates embodiments that consist essentially of the elements, ingredients, components, or steps.

Plural elements, ingredients, components, or steps can be provided by a single integrated element, ingredient, component, or step. Alternatively, a single integrated element, ingredient, component, or step might be divided into separate plural elements, ingredients, components, or steps. The disclosure of "a" or "one" to describe an element, ingredient, component, or step is not intended to foreclose additional elements, ingredients, components, or steps.

Modifiers immediately preceding or immediately following a list can be attributed to each item in the list. For example, "at least 5%, 10%, or 15%" is equivalent to "at least 5%, at least 10%, or at least 15%". As another example, "5%, 10%, or 15%, by weight of the composition" is equivalent to "5% by weight of the composition, 10% by weight of the composition, or 15% by weight of the composition". A combination of either of these two styles may be found throughout the specification and the presence of one style is not intended to foreclose the use of another style elsewhere in the specification.

REFERENCE NUMERALS

1—Vehicle body member; 2—Joint; 4—Surface; 10—Structural reinforcement; 12—First wall; 13—Second wall; 14—Third wall; 15—Fourth wall; 16—Edge; 22—Spacer legs; 24—Channel; 30—Curable adhesive; 40—Opening; 41—Fastener.

What is claimed is:

1. A structural reinforcement, for a vehicle, comprising:
 (a) a first wall,
 (b) a second wall extending perpendicularly from an edge of a first side of the first wall,
 (c) a third wall coupled to and extending perpendicularly between the first wall and the second wall,
 (d) one or more spacer legs extending from a second side of the first wall and defining a first channel,
 (e) one or more spacer legs extending from a second side of the second wall and defining a second channel, and
 (f) a curable adhesive disposed in the first channel and the second channel and on the third wall;
 wherein the structural reinforcement is configured to reinforce a joint; and
 wherein the one or more spacer legs of the first wall and the one or more spacer legs of the second wall each include two spacer legs coupled to opposing edges respectively of the first wall and the second wall.

2. A body member of a vehicle having the joint, the body member comprising the structural reinforcement according to claim 1.

3. The body member according to claim 2, wherein the structural reinforcement is adapted to located on two or three interfacing surfaces of the joint.

4. The structural reinforcement according to claim 1, wherein the structural reinforcement comprises an opening on the first wall, the second wall, the third wall, or any combination thereof; and wherein the opening accepts a fastener to fasten to the structural reinforcement to the joint.

5. The structural reinforcement according to claim 4, wherein the structural reinforcement comprises one or more base materials, one or more reinforcement components, or both.

6. The structural reinforcement according to claim 5, wherein the one or more base materials are selected from a polyamide, a polyester, a polypropylene, a polyethylene, a polysulfone, a thermoplastic imide, a polyether imide, a polyether sulfone, or any combination thereof.

7. The structural reinforcement according to claim 6, wherein the one or more reinforcement components are selected from mineral reinforcements, glass beads, glass bubbles, glass fibers, aramid fibers, carbon fibers, ceramic fibers, nylon fibers, the like, or any combination thereof.

8. The structural reinforcement according to claim 6, wherein the curable adhesive comprises polyvinyl butyral, a thermoplastic epoxy, an epoxy-elastomer adduct, or any combination thereof.

9. The structural reinforcement according to claim 8, wherein the curable adhesive is a heat-activated epoxy.

10. The structural reinforcement according to claim 9, wherein the curable adhesive is disposed as one or more strips within each of the first and second channels.

11. The structural reinforcement according to claim 9, further comprising a fourth wall coupled to and extending perpendicularly between the first wall and the second wall, the fourth wall being in opposing relationship to the third wall.

12. The structural reinforcement according to claim 11, wherein the third wall and the fourth wall extend from corner-to-corner of the first and second walls.

13. The structural reinforcement according to claim 12, wherein the curable adhesive is disposed as two strips within each of the first and second channels.

14. A structural reinforcement, for a vehicle, comprising: a first wall, a second wall extending perpendicularly from an edge of a first side of the first wall, a third wall coupled to and extending perpendicularly between the first wall and the second wall, two spacer legs extending from a second side of and from opposing edges of the first wall and defining a first channel, two spacer legs extending from a second side of and from opposing edges of the second wall and defining a second channel, and a curable adhesive disposed as two discrete strips in each of the first and second channels, and on the third wall; wherein the structural reinforcement is configured to reinforce a joint; wherein the first wall, the second wall, or both comprise an opening adapted to accept a fastener; and wherein the structural reinforcement is fabricated from a fiber-filled polymeric material.

15. The structural reinforcement according to claim 14, wherein the curable adhesive comprises polyvinyl butyral, thermoplastic epoxy, epoxy-elastomer adduct, or any combination thereof.

16. The structural reinforcement according to claim 15, wherein the curable adhesive is a heat-activated epoxy.

17. A reinforced vehicle joint system comprising: (a) a joint having three interfacing surfaces; (b) a structural reinforcement comprising: a first wall, a second wall extending perpendicularly from an edge of a first side of the first wall, a third wall coupled to and extending perpendicularly between the first wall and the second wall, two spacer legs extending from a second side of and from opposing edges of the first wall and defining a first channel, two spacer legs extending from a second side of and from opposing edges of the second wall and defining a second channel, and a curable adhesive disposed as two discrete strips in each of the first and second channels, and the curable adhesive is disposed on the third wall; wherein the structural reinforcement is configured to reinforce the joint; wherein the first wall, the second wall, or both comprise an opening adapted to accept a fastener which extends into the joint; wherein the structural reinforcement is fabricated from a fiber-filled polymeric material; and wherein the two spacer legs of the first wall are engaged on a first of the three interfacing surfaces, the two spacer legs of the second wall are engaged on a second of the three interfacing surfaces, and the third wall is adhered to a third of the three interfacing surfaces via the curable adhesive.

18. The reinforced vehicle joint system according to claim 17, wherein the curable adhesive comprises polyvinyl butyral, thermoplastic epoxy, epoxy-elastomer adduct, or any combination thereof.

19. The reinforced vehicle joint system according to claim 18, wherein the curable adhesive is a heat-activated epoxy.

20. The reinforced vehicle joint system according to claim 19, wherein the curable adhesive is activatable to foam.

\* \* \* \* \*